US006297724B1

(12) United States Patent
Bryans et al.

(10) Patent No.: US 6,297,724 B1
(45) Date of Patent: Oct. 2, 2001

(54) LIGHTING CONTROL SUBSYSTEM FOR USE IN SYSTEM ARCHITECTURE FOR AUTOMATED BUILDING

(75) Inventors: Darryl J. Bryans, Washington, DC (US); Lance B. Jump, Gaithersburg, MD (US)

(73) Assignee: The Whitaker Corporation, Wilmington, DE (US)

( * ) Notice: Subject to any disclaimer, the term of this patent is extended or adjusted under 35 U.S.C. 154(b) by 1058 days.

(21) Appl. No.: 08/613,828

(22) Filed: Mar. 7, 1996

Related U.S. Application Data

(63) Continuation of application No. 08/303,967, filed on Sep. 9, 1994, now abandoned.

(51) Int. Cl.[7] .................................................... G06F 15/46

(52) U.S. Cl. ........................... 340/3.51; 340/3.21; 307/38

(58) Field of Search .......................... 340/825.06–825.08, 340/825.5, 825.52; 307/38–42; 315/291, 294, 295, 312–315; 364/492

(56) References Cited

U.S. PATENT DOCUMENTS

| | | | | |
|---|---|---|---|---|
| Re. 33,504 | | 12/1990 | Yuhasz et al. | 307/115 |
| 4,127,845 | * | 11/1978 | Dansbach et al. | 340/870.99 |
| 4,215,276 | * | 7/1980 | Janeway | 307/40 |
| 4,484,190 | * | 11/1984 | Bedard | 340/825.57 |
| 4,484,258 | * | 11/1984 | Miller et al. | 340/825.07 |
| 4,540,890 | * | 9/1985 | Gangemi et al. | 307/41 |
| 4,567,557 | * | 1/1986 | Burns | 340/825.06 |
| 4,649,323 | | 3/1987 | Pearlman et al. | 315/307 |
| 4,667,193 | * | 5/1987 | Cotie et al. | 340/825.08 |
| 4,889,999 | * | 12/1989 | Rowen | 307/31 |
| 4,954,768 | | 9/1990 | Luchaco et al. | 323/300 |
| 4,964,058 | * | 10/1990 | Brown, Jr. | 340/825.07 |
| 5,064,386 | | 11/1991 | Dale et al. | 439/535 |
| 5,089,974 | * | 2/1992 | Demeyer et al. | 340/825.07 |
| 5,170,068 | * | 12/1992 | Kwiatkowski et al. | 315/295 |
| 5,175,677 | * | 12/1992 | Kushiro et al. | 340/825.06 |
| 5,191,265 | | 3/1993 | D'Aleo et al. | 315/295 |
| 5,218,522 | | 6/1993 | Phelps et al. | 363/124 |
| 5,233,342 | * | 8/1993 | Yashiro et al. | 340/825.06 |
| 5,237,207 | | 8/1993 | Kwiatkowski et al. | 307/31 |
| 5,410,292 | * | 4/1995 | Le Van Suu | 340/825.08 |
| 5,621,662 | * | 4/1997 | Humphries et al. | 340/825.08 X |

OTHER PUBLICATIONS

Smart Bridge; Jul. 1992; by Smart Interface Corporation.
Home Works Integrated Lighting Control System; 2/94; by Lutron; 21 pages.
GE Wiring Devices; 4/89; 19 pages.
AMP Smart House; 11/92; 10 pages; by AMP.
AMP Catalog; PM 106; 4/94 by AMP.

* cited by examiner

*Primary Examiner*—Michael Horabik

(57) ABSTRACT

An electrical power control system is adapted for controlling power and lighting in a building. Switch controls have either relays or triacs, controlled by microprocessors, to switch power on electrical branch circuits. An interface device 122 communicates with the switches 124,126, arranged in a multidrop configuration, with variable length data packets over serial branch circuits or data buses 142. In addition to being controlled by the interface device 122, the switch controls also have local switch actuators. The actuation of the local switch controls can be used by the interface device 122 as a control inputs to initiate other actions. Adaptive polling of switch controls is used to minimize system response time, and both transmit and receive signals are carried between the switch controls and the interface device 122 at different times on the same twisted pair wires. The interface device 122 can also communicate with a home automation system controller.

12 Claims, 8 Drawing Sheets

LIGHTING CONTROL SUBSYSTEM FOR USE IN SYSTEM ARCHITECTURE FOR AUTOMATED BUILDING

This application is a Continuation of application Ser. No. 08/303,967 filed Sep. 9, 1994, now abandoned.

FIELD OF THE INVENTION

This invention is directed to building automation systems and in particular to lighting control subsystems used in such systems.

BACKGROUND OF THE INVENTION

Home automation or management systems which permit increased control of at least some of the electrical subsystems in a dwelling have begun to replace or to supplement conventional wiring systems. These systems can provide automatic control of or can provide increased user control options for such systems as electrical power and lighting, heating ventilation and air conditioning, audio/video home entertainment systems, security systems, telecommunications equipment, and landscape maintenance systems such as automatic lawn sprinklers.

These home automation systems can be integrated systems in which control of all subsystems is managed by a central system controller. Other systems rely upon the use of distributed intelligence in appliances or subsystems, which can talk to each other, but which do not require a central controller. There are a number of physical control communications media for both the integrated and the distributed systems. Control signals can be transmitted over twisted pair wire, coaxial cables, fiber optic cables, special low voltage cables, and by power line carrier systems which superimpose signals on the alternating current on conventional 12 or 14 AWG branch wiring conductors. To date, no single approach has proven superior either in terms of performance or in terms of economics. Those systems which provide significantly enhanced features have tended to be relatively expensive, while inexpensive systems offer limited features and can be unreliable.

One example of an integrated home automation system is described in U.S. Pat. No. 5,218,552. That system uses a system controller which provides control communications over thirty polled branches, each of which have thirty input/output nodes. The system controller polls each of the nodes for inputs and or output which can be in the form of status and control packets consisting of several bytes or can be in the form of longer messages. Each node can serve as the interface for either a simple device, such as switching device for a lighting fixture, or a relatively more sophisticated device containing distributed intelligence for communication at a higher level with the system controller or with appliances on other nodes. In order to handle the more sophisticated messaging communications, each node interface has to have greater capability than would be necessary for the more simple status and control communication. In order to decrease response time to status and control communications, which is necessary for power and lighting control, the system controller in this system uses two processors which simultaneously poll the nodes on the system. A control processor provides for more rapid status and control information while a message processor polls the nodes for messages.

One of devices which can be used in the system disclosed in U.S. Pat. No. 5,218,552 is an input/output module. This input/output module contains both the branch interface and an appliance interface device described in that patent. Eight single bit inputs in the form of optoisolators and eight single bit outputs in the form of relays can be used in this input/output module and these parallel inputs and outputs are converted into a serial bit stream for communication with the system controller. Inputs from doorbells and other sensors and outputs such as lawn sprinklers and draperies can be integrated into this system by this input/output module.

A dimmer control which can be used with the system controller described in U.S. Pat. No. 5,218,552 is described in U.S. Patent application Ser. No. 08/212,486 in the name of Lee Steely, Darryl Bryans and Lance Jump. This patent application discloses a dimmer block which is used on one of the branches to control incandescent and low voltage lighting loads. All inputs to this dimmer must originate with a separate low voltage switch located remotely from the dimmer block or from the System Controller. Many of the same functions, such as ramping, jumping to a preset level, and extended ramping are implemented by the device described in this prior pending patent application are also implemented by the dimming control described herein.

A multiposition switch which can be used as part of the system described in U.S. Pat. No. 5,218,552 is described in U.S. patent application Ser. No. 08/218,964, filed in the name of Darryl Bryans, H. R. Colbaugh, David Kosen, Lance Jump and Robert Pitts. The low voltage switch device described in that prior pending patent application can be programmed to activate switch blocks containing relays and dimmer blocks containing triacs by configuring the dynamic event action table in the system controller described in U.S. Pat. No. 5,218,552.

The Lutron HomeWorks Interface Panel provides an interface between inputs and outputs for a lighting control system. The interface panel consists of two components; an enclosure and an electronics sub-panel. The electronics subpanel serves as a system manager which receives all switch information, processes commands and transmits system data. The inputs include keypads, security system contact closures, RS 232 serial two-way communications with PC's and other systems, and a telephone interface. The RS-232 interface facilitates communication to and from home controllers and personal computers in an ASCII format. Outputs are either star wired or wired on a Class 2 bus wire platform. Outputs on the bus wire platform include multi-channel controls, local single channel control dimmers and switches, master keypads and an RS 232 port. The local control dimmers and switches contain triacs and an integrated circuit and are daisy-chained on the bidirectional communications bus. Power relay cards and output interface cards for on/off control of external equipment, such as audio/video systems are located on the star wire platform.

U.S. Pat. No. 5,237,207 discloses another system for controlling multiple loads from a central location and from local three-way controls. This system employs an interface device which receives low voltage signal inputs from a master keypad which can be used to activate multiple local controls. The local controls are attached by a line voltage circuit to the interface and switches in the interface and in the local controls can both turn the power to the load on or off or can dim the load.

SUMMARY OF THE INVENTION

This system for controlling electrical power includes an interface controller to which switching devices are attached on branch data buses. A plurality of individually addressable switching devices can be attached on each branch data bus. Both switches containing relays which permit switching lighting fixtures and receptacle outputs between on and off states and dimming switches using triacs for proportional control of loads are employed. The interface device polls selected switching devices over a single pair twisted wire branch data bus so that an input to one switch device can be used to control another switch device or can be used as an event to control another system action. Transmission and receipt of signals occurs over the same single pair cable, but under the control of the interface device, transmission and receipt of signals do not occur at the same time. Each switching device includes a microprocessor to communicate with the interface controller and the interface controller can communicate with the system controller. Each switching device can be locally controlled or it can be controlled by the interface controller or by a system controller to which the interface controller responds.

Prior art home control systems and lighting control systems or subsystems are generally incompatible with conventional wiring techniques. One common complaint is that the additional wiring required for such system results in a maze of additional wiring. The prior art systems also tend to be relatively expensive. An object of the instant invention is to provide a system that is compatible with existing wiring, and requires only the addition of easy to install low voltage wiring during initial construction. The cost of the initial installation of the lighting control system or subsystem can therefore be significantly reduced. An ancillary object of this invention is to provide a system in which the compatibility with conventional wiring techniques permits prewiring at a relatively low cost so that conventional wiring can be initially used and the system can later be upgraded. The homeowner or the builder therefore would not have to initially install the relatively more expensive components of the system, but could still upgrade the system at a later date. The installation of the low voltage wiring for control of the switching devices, unlike powerline carrier systems, isolates switching control from extraneous noise providing a more reliable system at relatively low initial installation cost. The use of low voltage wiring for switching control also simplifies subsequent retrofiting. A further object of this invention is to provide for the installation of numerous switching and dimming devices without the need for dedicated wiring runs to each of those individual devices. This invention therefore includes a plurality of devices in a multidrop configuration on single branch data buses. An additional object of this invention is to provide for switching and dimming devices which can be used with different systems and with different system protocols and to provide an interface device with which these switches and dimmers can be used. To use the same switches and dimmers with different systems, only the system interface in the interface device need be changed.

An embodiment of the present invention will now be described by way of example with reference to the accompanying drawings.

DESCRIPTION OF THE DRAWINGS

FIG. 3 is a diagram of the half-duplex communication paradigm used in the relay and dimmer blocks of the present invention.

DESCRIPTION OF THE PREFERRED EMBODIMENT

The preferred embodiment of this invention is used with the system controller described in U.S. Pat. No. 5,218,552. The interface device, branch data network and the switch control blocks which comprise the lighting control subsystem of the preferred embodiment can be employed with other systems so long as the proper communications protocol is established with that other system or system controller. The system controller with which the preferred embodiment is used communicates with the interface device by using event action controls so that for example, actuation of a low voltage switch, of the type described in U.S. Pat. No. 5,218,552 can be used as an event to activate one of the switching control blocks attached to the interface device. Alternatively a switch input to the interface device can be reported as an event to the system controller which can initiate an action for another device or subsystem attached to the system controller.

The interface device and the switching blocks will be described first with reference to communications within the subsystem. The various components will then be defined in more detail.

The present embodiment of the lighting control system is a home-automation network designed to control lights and outlets. Blocks 124, 126 controlling lights and outlets communicate serially with the peripheral interface adapter, interface device, or lighting controller 122 (PIA) over an opto-isolated communication link. “In FIG. 1, relay blocks 124 are identified by the label “RB” and dimmer blocks 126 are identified by the label “DB”. The serial link 142 is composed of twisted pair wires that connect each light or outlet. It is possible to communicate with up to 30 individual units on a single serial link. Each PIA supports up to 4 serial links.

The branch serial system is designed to upgrade a conventionally wired home. During construction, standard outlets and switches are installed using NM and standard outlet and switch boxes. Following this, unshielded, twisted pair wire is connected in a daisy-chain fashion to each switch block (node). Each run of up to 30 nodes is returned to a location designated for a PIA. Up to 4 PIAs can be installed per home allowing up to 480 lights and outlets to be controlled. When used with a system controller of the type described in U.S. Pat. No. 5,218,552 each PIA requires a dedicated run of applications cable back to the system controller at the load center This system operates each serial link (or"branch") in a multidrop configuration. In this configuration, all the nodes are wired in parallel on the serial link. The parallel wiring technique provides security against a power failure at an individual node disabling a complete branch. If power is lost at a node, communication to that node is lost, but communication to the rest of the nodes on the branch remains intact.

Figure 1:
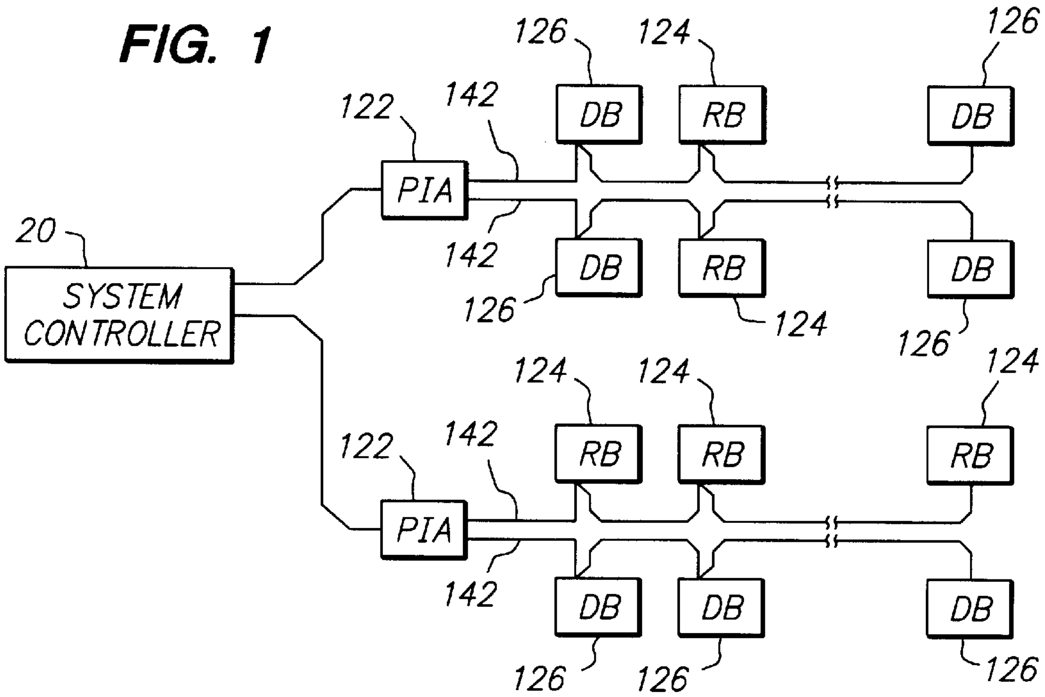
FIG. 1 is a schematic of the peripheral interface apparatus system of the present invention.

A two-way, half-duplex link exists between the PIA and the nodes. A single pair of wires is used for transmitting and receiving to and from the nodes. Node receivers are always enabled to allow them to receive the PIA-initiated commands or polls. Nodes transmit one-at-a-time, that is, they disable their transmitters when not communicating. FIG. 1 shows a typical layout for the system.

The serial link consists of a master (the PIA) and a number of slaves (blocks) 124, 126. The blocks shall contain a low-cost microcontroller such as a Z86E04. One physical serial connection, RX/TX+ and RX/TX−, provides the communication path between the PIA and the blocks. In this embodiment the physical serial connection is physically in the form of a single twisted pair branch 142.

Since all blocks listen to all PIA broadcasts, the destination block is identified by an address field within the PIA packet. AN "all station" address (0) is reserved to the PIA to give various supervisory commands and polls. Similarly, block packet originators are identified by an address field within the block packets. Most packets are immediately acknowledged and retransmission is used as the error control protocol. Packets are checksummed to detect errors. A special bit in each byte is used to signal the start of the packet. The network supports up to 30 nodes.

Only packets from the Master to the slaves are explicitly acknowledged. Slave packets are issued in response to a Master request. Master commands that normally elicit a response from the slave are implicitly acknowledged by the response. The master should not issue a packet on the all station address (0) that would be acknowledged by the slave. The slaves do not suppress acknowledgments to packets received on the all station address. However, if multiple nodes attempt responses then the responses will collide and be lost. The all-station address can be used to identify a node if there are not other nodes on the net. Slaves will always respond with their actual address even if accessed with the all station address.

Packets issued by the PIA should cause an immediate response from the block since the PIA cannot continue communications until it has either received a response or has timed-out waiting. To keep the performance high, the time out period is kept short.

Although the branch network uses a bidirectional link for the PIA to transmit to the nodes and for the nodes to reply, the unique physical interface circuitry on the branch allows nodes only to hear transmissions from the PIA. The nodes cannot hear transmissions from other nodes. This is important both to reduce the processing requirements within the nodes and to minimize the probability of nodes misinterpreting replys from other nodes as PIA transmissions.

All packets start with a header byte. The format for the header byte is shown below. The header byte is distinguished from all other packet bytes by a "1" in the most significant bit (bit 7). The least significant five bits of the header byte are the node address. The address is that of the slave device regardless of the packet direction. Slaves use incoming address fields to filter data not intended for them, and they use their own address in response packets to tell the master who is responding.

Packet Header Byte

| 7 | 6 5 | 4 . . . 0 |
|---|---|---|
| 1 | Packet Type | Slave Address |

A two bit packet type field within the header byte identifies the packet type. The meaning of this field depends on the direction of the packet. The packet types are defined below. Only the type 0 packets (which are single-byte) do not have checksums. These are sent as polls and acknowledgements by the master and slaves respectively. These packets do not cause power or state changes if inadvertently interpreted due to corrupted data.

Packet Types from Master to Slave

| Packet Type Number | Packet Type | Checksum | Bytes |
|---|---|---|---|
| 00 | Poll | No | 1 |
| 01 | Turn Off | Yes | 2 |
| 10 | Turn On | Yes | 2 |
| 11 | Extended | Yes | 4, 6, 8 or 10 |

Packet Types from Slaves to Master

| Packet Type Number | Packet Type | Checksum | Bytes |
|---|---|---|---|
| 00 | Acknowledge | No | 1 |
| 01 | Reserved | Yes | N/A |
| 10 | Reserved | Yes | N/A |
| 11 | Extended | Yes | 4, 6, 8 or 10 |

The checksum (for those packets that use one) is a seven bit value that will cause the modulo 128 sum of all the bytes in the packet (including the header and checksum bytes) to be the value 0. The checksum byte is computed by the sender by summing all of the bytes up to (but not including) the checksum byte. The resultant value is subtracted from 0 and the modulo-result is the checksum to be sent. The receiver validates a packet by summing all of the bytes (including the checksum) and checking the low 7 bits for the value of 0.

Three types of packets are used, single byte, short and extended. The single byte packet provide for quick polls and acknowledgments. Since these packets do not control power or have visible consequences if they are interpreted wrong, they are sent without a checksum. The format of the Poll packet and the Acknowledge packet is identical and is shown below.

Poll Packet (Master to Slave) and Acknowledge Packet (Slave to Master

| 7 | 65 | 4 . . . 0 |
|---|---|---|
| 1 | 00 | Slave Address |

The "turn on" and"turn off" packets (only sent from the master to the slaves) include checksums and are two bytes each. These are called short packets and they allow efficient transmission of on/off commands. The format for these packets is shown below.

Turn-on and Turn-off Packets (Master to Slave)

| 7 | 6 | 5 | 4 | 3 | 2 | 1 | 0 |
|---|---|---|---|---|---|---|---|
| 1 | 01: Turn on<br>10: Turn off | | Slave Address | | | | |
| 0 | Checksum | | | | | | |

The extended packet is of variable length and allows larger amounts of information to be transmitted to/from nodes. The extended packet has a command byte immediately following the header byte. The command byte specifies the command type, the number of data words in the packet and a parameter. The format of the extended packet is shown below.

EXTENDED PACKET

| 7 | 6 | 5 | 4 | 3 | 2 | 1 | 0 |
|---|---|---|---|---|---|---|---|
| 1 | 1 | 1 | Slave Address | | | | |
| 0 | Data Length | | Command | | Parameter | | |
| 0 | Data Word 1 | | | | | | |
| 0 | . . . | | | | | | |
| 0 | Data Word N | | | | | | |
| 0 | Checksum | | | | | | |

The Data Length field of the command byte specifies the number of data words included in the packet between the command byte and the checksum byte.

Data Length:

00: 1 data word.

01: 3 data words.

10: 5 data words.

11: 7 data words.

| Command: | FROM PIA | FROM NODE |
|---|---|---|
| | 00: Reserved | 00: Reserved |
| | 01: Read | 01: Report |
| | 10: Write | 10: Reserved |
| | 11: Trap | 11: Reserved |

The parameter field specifies 1 of 8 parameters per node that can be read, written or trapped by the PIA. The parameter meaning is specific to the type of node. For example, a dimmer may have an extended ramp time parameter while this would not be applicable to a relay.

The slaves will typically be implemented using a microcontroller which may not be very powerful or contain sufficient resources for complex protocols. For example, the present dimmer and relay blocks are based on Zilog's Z8 family of microcontrollers. The device used in the relay block is a Z86C04 which has only 1024 bytes of ROM and 124 bytes of RWM. It also contains no UART. The protocol is essentially half duplex and the slave nodes make use of this fact to implement the protocol within their limited resources. The asynchronous character send and receive routines are implemented using an interrupt driven UART simulator. If the microcontroller used has a UART, then the code can be simplified greatly.

Figure 2:
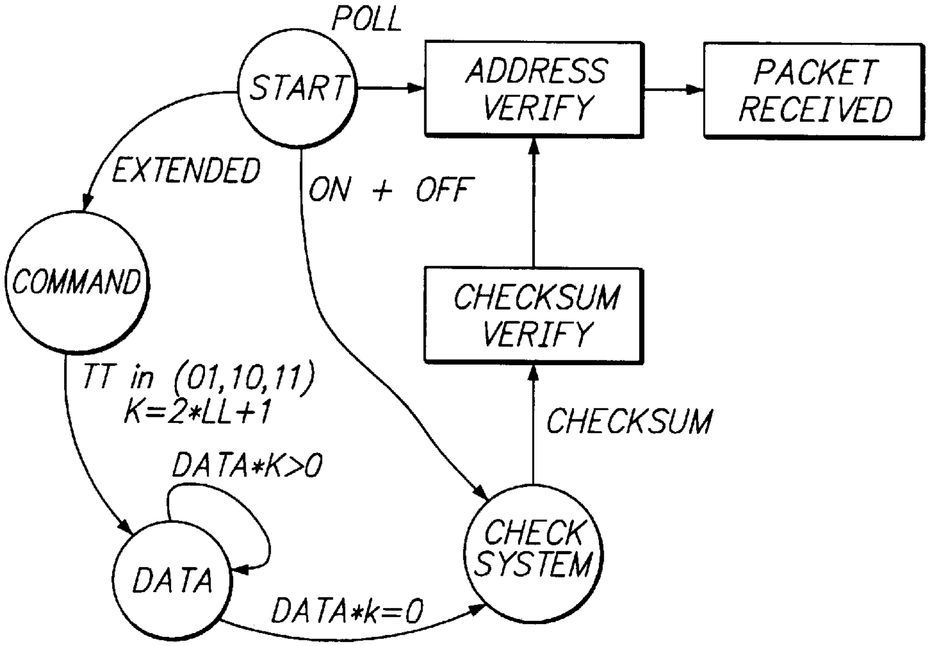
FIG. 2 is a diagram of the receive packet recognizer used in the relay and dimmer blocks of the present invention.

Regardless of how the characters are received, the next level of the network code works on characters. FIG. 2 is the diagram of the receive packet recognizer used by the slaves. The packet receive system starts in the START state in that diagram and remains there until a header byte is received. The header byte is recognized by the presence of a '1' in the most significant bit (all other packet bytes have a '0' in that bit). Any character that is not part of a valid packet sequence will cause a transition back to the START state. That erroneous character is then re-evaluated in the START state to see if it is the start of a new packet. To simplify the diagram, such transitions are not explicitly shown.

The network subsystem in the slave nodes operates using a half duplex communication paradigm as depicted in FIG. 3. A slave node listens to network packets and only responds when it receives a valid packet addressed to it (or on the all station address—0). When such a packet is received, the slave network code disables the receiver and passes the packet to the slave application. The application can either respond to the packet or ignore it. To ignore the packet, the application must inform the network module that no response will be sent. Slave applications will ignore packets that they do not understand.

If the application chooses to send a response, the network node enters a transmission state in which it enables the transmitter and send the packet back to the master. When the last bit of the last character in the packet has been sent, the network subsystem re-enables the receiver and resumes listening for valid packets addressed to it.

Unlike most polled networks, this system uses an adaptive polling scheme that minimizes response time without increasing the poll rate. The PIA"adapts" to the current home programming so that only those blocks that are currently programmed as input devices to the system are polled. In general, only a few of the switches attached to the relay and dimmer blocks will be used as programmed input events. With just a few input switches, the PIA can maintain a less than 100 ms response time using the adaptive polling technique. A standard polling system would require a much higher baud rate to achieve the same response time.

The network physical layer consists of a single twisted pair bus. All slave nodes listen on the bus at all times. The bus comprises the signal pair RX/TX+ and RX/TX−. This pair is driven differentially by the master to transmit. To transmit a mark, the master drives RX/TX+ to +3 volts with respect to RX/TX−. The master sends a space by driving RX/TX+ to −3 volts with the respect to RX/TX−.

Figure 4:
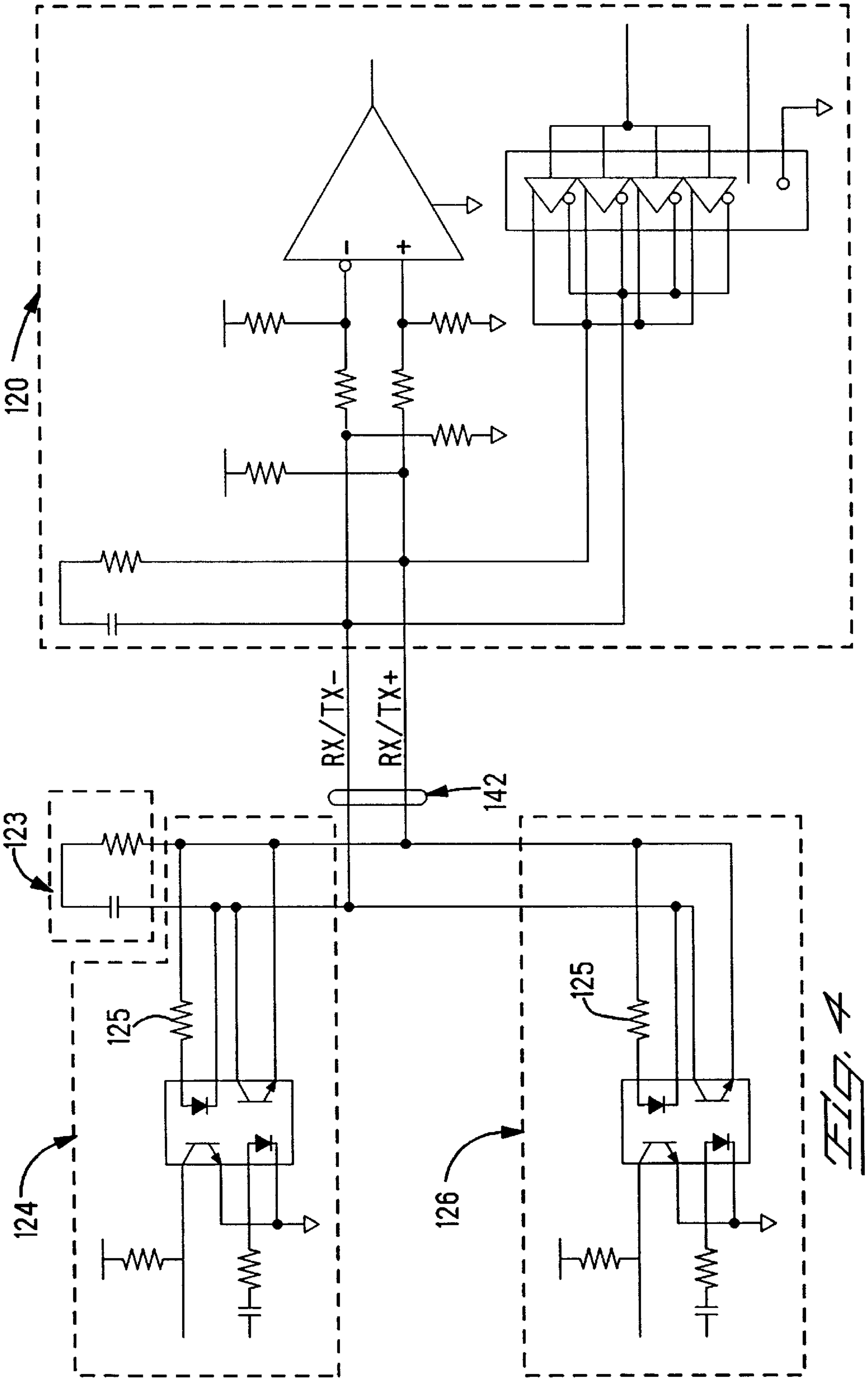
FIG. 4 is a diagram of the physical interface network interface circuitry of the slave blocks, including relay and dimmer blocks, and the peripheral interface apparatus of the present invention.

The signal transmitted by the master is received by the slaves using opto isolators. A 180 ohm input resistor 125 is used on the receive circuit as shown in FIG. 4. This produces a minimum of about 4 milliamps to each node even in a fully loaded system. In order to drive a fully populated branch, therefore, the master shall be capable of driving approximately 120 milliamps. The slave nodes are connected in daisy chain fashion with the node farthest from the master having an AC termination 123 on the bus.

The bus is driven by each slave using a floating (opto-isolated) NPN transistor as shown in FIG. 4. The emitter is connected to RX− and the collector is connected to RX+. The slaves send a mark by turning off this transistor and they send a space by turning it on. Thus the bus is a normally-open, wire-ORed multiple access bus. AC termination for the bus is provided on both the master and the slave that is electrically farthest from the master. The physical network interface circuitry is shown in FIG. 4. Each slave 124,126 must be capable of sinking 4 milliamps.

The receive circuitry on the PIA has 3 main features: 1) opto-isolation from the blocks, 2) common-mode rejection due to the differential receiver, and 3) differential noise immunity achieved by biasing the receiver for a ±2.5V signal.

The PIA transmit/node receive circuit provides similar features but is implemented differently. The opto-isolator's diode provides a good common mode rejection ratio since it is a current device. The differential rejection (or noise margin) is achieved by using a differential driver. Additionally, the PIA usually drives this line producing a very low impedance circuit.

Figure 7:
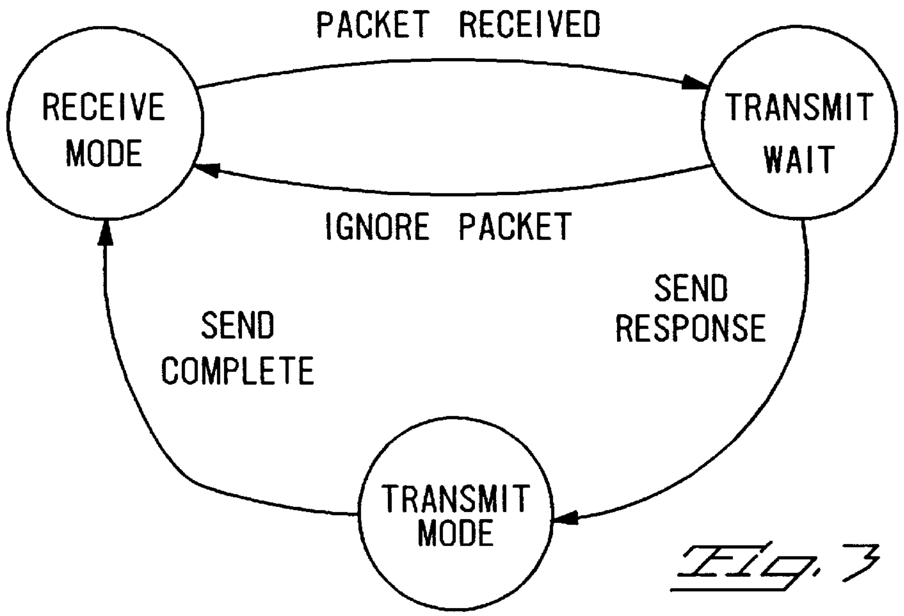
FIG. 7 is a schematic of an on/off block which could be used in the preferred embodiment of this invention using a branch or multidrop control wiring approach.
Figure 5:
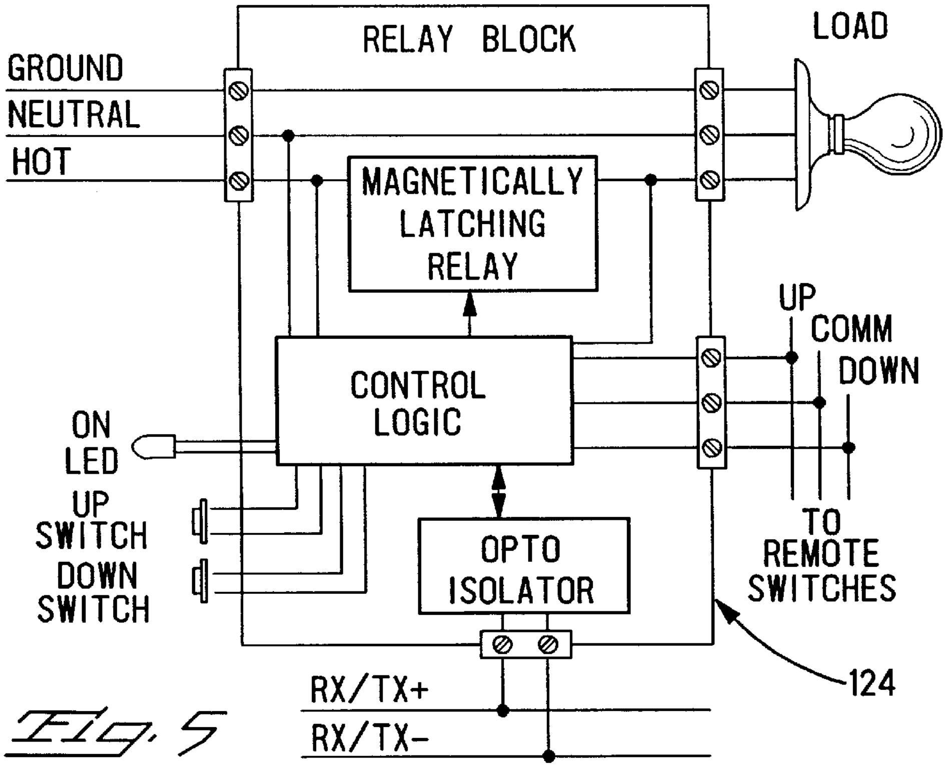
FIG. 5 is a diagram of the relay block employed in the present invention.

This system is especially adapted for use of relay blocks and dimmer blocks at the nodes. The relay block uses a magnetically latching relay to control the power to a load. FIG. 5 is a block diagram of the relay module. A schematic of the relay block circuitry is shown in FIG. 7 which will be discussed in more detail subsequently. Relay block 124 is placed between the AC hot line and the controlled load. AC neutral is passed directly to the load and is also used within the relay block for AC sensing and for the local power supply return. The AC ground (earth ground) is unused by the relay block.

Power delivery to the load can be controlled either via the system or from the local Up and Down switches. The local and remote switches are current-limited to class 2 levels. The network interface is opto-isolated.

The relay block is locally controlled by the On and Of f switches. Pressing"On" will cause the block to switch the relay on if it is not already on. The relay is the power switching element of the relay block. Similarly, the"Off" switch is used to turn the relay off if it is not already off. Pressing both switches (which is not physically possible with a rocker style switch actuator as used in this embodiment) will turn the relay off if it is on.

The relay can also be controlled using the network. The block responds to the"turn on" and"turn off" commands by turning the relay on and off respectively. These are the only power control commands used on the relay block.

The other relay block registers have no direct effect on the power delivered to the load. Those registers are described subsequently.

The relay block has a register file that is used to monitor it. The block control is performed using the "Turn on" and"Turn off" commands. The register file is accessed using the extended packet types previously specified. The following table identifies the purpose for each register, its index (address) and its type. The register type may be read (R) write (W) or both (R/W). The number in parenthesis in the"Type" column indicates the number of 7-bit data words associated with the register. Extra,"padding" packet bytes may be required to access a register since only 1, 3 5 or 7 data words are allowable in the extended packet type.

Relay Block Register

| Index | Name | Type | Description |
|---|---|---|---|
| 0 | Identification | R(2) | Block identification |
| 1 | Status | R(1) | Block status |

Status Register Bit Definition

| 7 | 6 . . . 4 | 3 | 2 | 1 | 0 |
|---|---|---|---|---|---|
| 0 | Reserved | On switch on | Off switch on | Relay flag | Feedback (load power sense) |

In this embodiment, the relay block uses a Takamisawa VSL 24 MC-NR nonpolarized magnetically latching relay. Since the relay used in this block is a magnetically latching type, the relay coil does not need to be constantly energized to turn the relay on. The block uses the AC hot signal on the load side to determine whether the relay is on or off. This is called the feedback signal within the control logic of the block. The block also keeps an internal flag (the relay flag) to tell it whether the relay should be on or off. Whenever the feedback signal and the relay flag disagree, the block will try to switch the relay. Both the relay flag and the feedback flag are available in the status register.

The relay flag is set by an"on" input or by an"off" input to the relay block. These"on" and"off" inputs can come from two different sources. The first source is the peripheral interface apparatus or PIA which inputs a signal over the data bus interface or signal branch. The second source would be the local switch on the block itself which has two momentary switch inputs S2—"on" and S3—"off". In any case the signal arriving at the relay block will be an on or off input and not a toggle input.

The relay switching circuit uses either a negative or a positive current through the single relay coil to switch the relay. This current is derived from the positive and negative cycle of the 60 cycle current between hot and neutral which are detected by the block circuitry. Since the on or of f input to the relay block from the PIA or from the local switch can arrive during the wrong half cycle, the relay flag must be first set or reset. If the relay flag and the feedback flag differ, the block waits until the appropriate positive or negative cycle (depending upon the state of the relay flag only) and then an optocoupler is closed to apply a current pulse to the relay coil to switch the relay in the appropriate direction. The relay flag is also used because occasionally it is necessary to pulse the relay several times before it actually switches.

The "On" LED indicator reflects the desired state of relay. That is, it indicates the state of the internal relay flag rather than the actual state of the relay. However, in normal operation, if the relay flag does not match the relay state, then there will be a feedback mismatch and the block will try to switch the relay.

A failure in the relay block that affects the feedback circuitry or the relay, can cause the control logic to continuously attempt to switch the relay. If the relay coil is repeatedly energized, both the relay and the coil current limiting resistor could fail. To help solve this problem, the block employs"relay rest logic" to reduce the average drive to the relay and the resistor. The logic will force a rest period of fifteen AC cycles after every three consecutive relay switch attempts. This logic reduces the average power to the coil to ⅙ of the value it would otherwise achieve. This is required to ensure short node response time in the event of fast commands. Thus, very rapid relay switch requests (on the order of 120 per second) for extended periods could cause the resistor to burn up (which will probably save the relay from destruction).

When the relay block looses power, the relay itself should remain in the last state achieved. Upon restoration of power, the control logic checks the feedback signal to determine if the relay is on or off. The block then forces the relay on and then turns it to the detected state. This is necessary since the relay can be latched on by sufficient current in either direction. Forcing the relay on allows the block to establish the polarity convention for the otherwise non-polarized relay.

Figure 9:
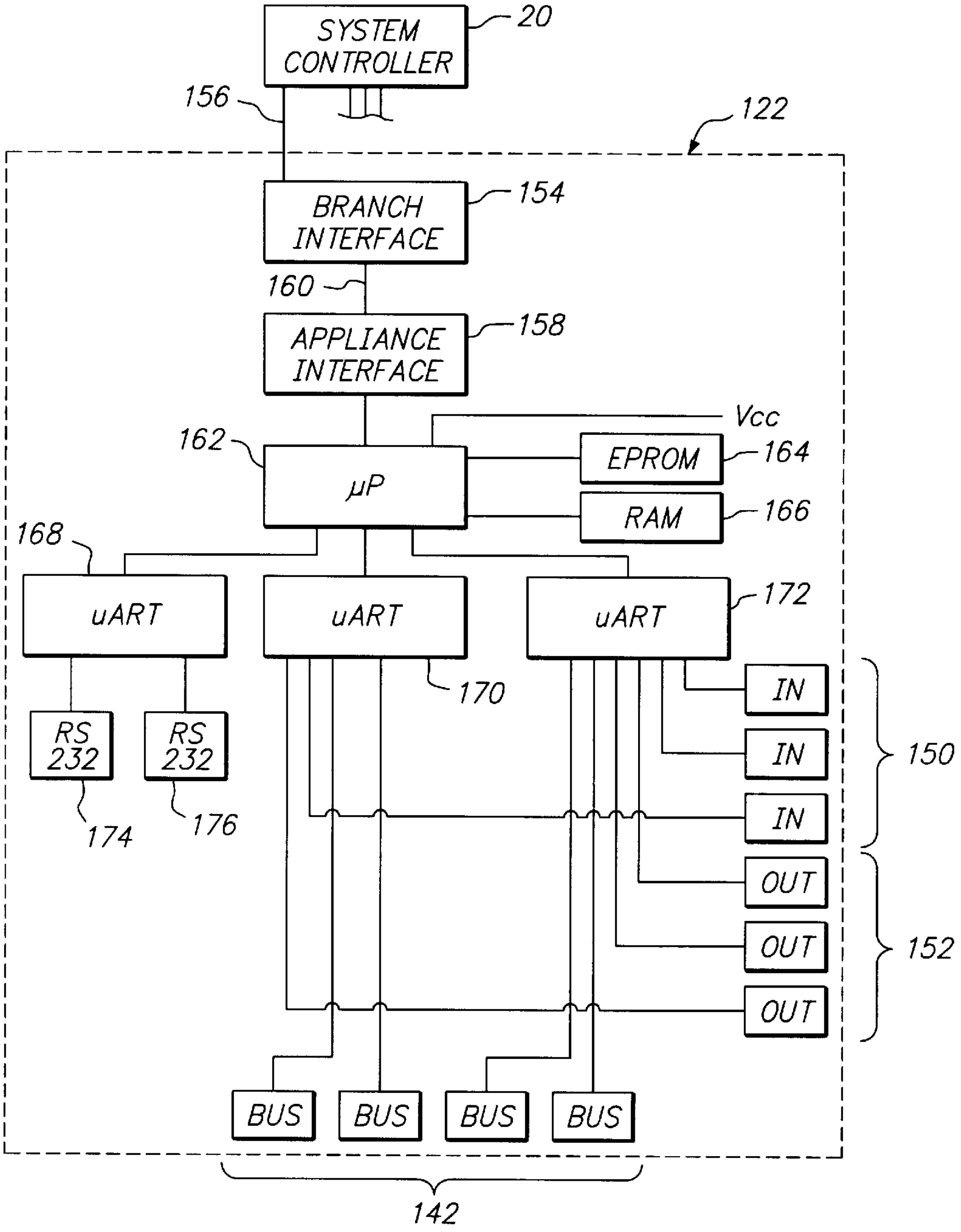
FIG. 9 is a diagrammatic view showing the basic components of the interface device used in the preferred embodiment of this invention.

The relay block 124 used in the preferred embodiment of this invention will now be described with reference to the more detailed schematic shown in FIG. 7. The relay block schematic shown in FIG. 7 shows that the data bus 142 is connected to an opto isolator U2R so that the relay block is isolated from signal levels on the data bus or branch 142. Signals transmitted from the master interface device 122, shown in FIG. 9, are detected by optoisolator U2R and are input into a microprocessor U1R over input lines RXDR. When the relay block 124 needs to transmit over the data bus or branch 142, the microprocessor U1R transmits over output line TXDR to the optoisolator U2R which then outputs the signal to the interface device 122 over the bus 142. The microprocessor U1R can consist of a Zilog 86C08 as previously discussed. Power to the relay block is provided from the hot line by a discrete component power supply.

Relay block 124 includes a magnetically latched single coil nonpolarized relay K1 which switches power on the Switched Hot line to control a load, such as a lighting fixture or receptacle outlet. Relay K1 is activated by a pulse through the coil in the relay, and the microprocessor U1R controls activation of relay K1. The microprocessor U1R pulses the relay by closing the optocoupler U3R to cause a current to flow through the relay coil. A current in one direction through the coil opens the relay while a current through the coil in the other direction closes the relay. Microprocessor U1R monitors the AC current through the ACSYNC line so that current can be applied to the coil only when the AC current is in the appropriate half cycle.

Inputs to the relay block 124 can be through the data bus or branch 142 or through two local switches S2R or S3R. In the preferred embodiment, these local switches are momentary normally open switches which are actuated by an mechanical actuator such as a one-piece rocker actuator which permits only one switch to be activated at a time. Auxiliary remote switches can also be attached to the relay block to activate the block in the same manner as the local switch actuators.

Since multiple relay switch blocks 124 can be located on the same branch, as well as multiple dimmer blocks 126, a means must be provided for establishing a unique address for the individual blocks. In the preferred embodiment of this invention, printed circuit board dip switch S1R is used to define this address.

Figure 6:
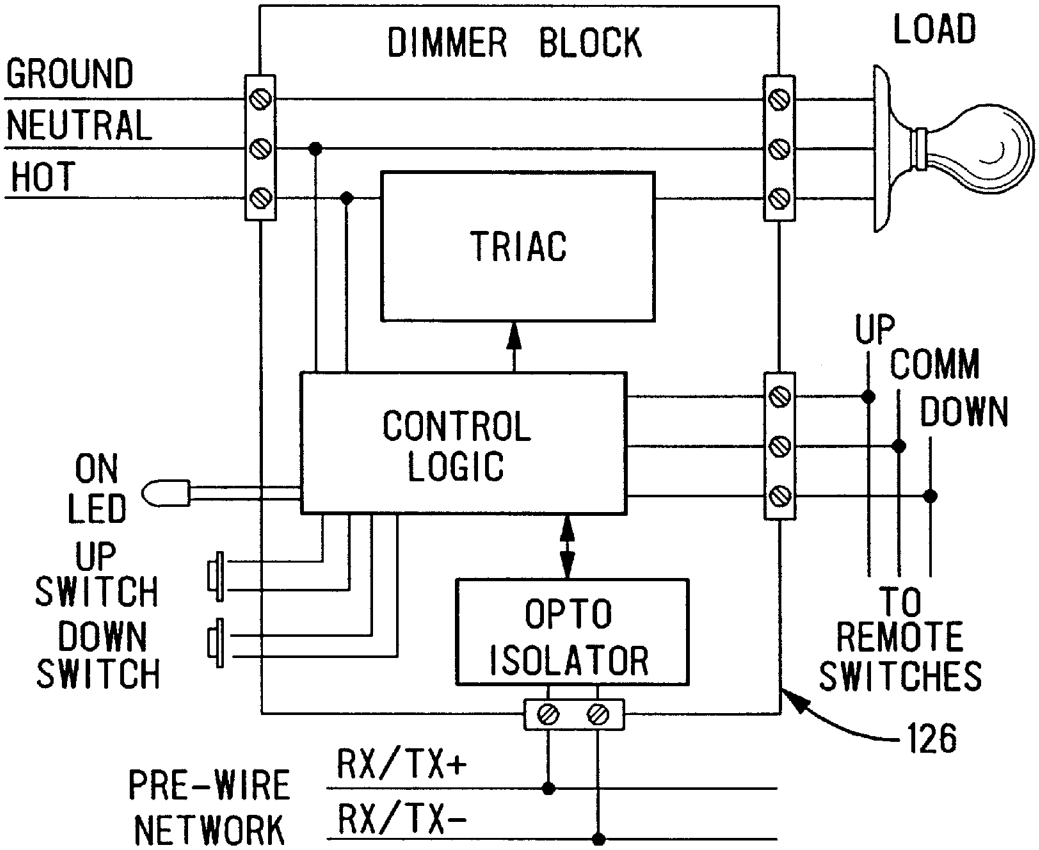
FIG. 6 is a diagram of the dimmer block employed in the present invention.
Figure 7:
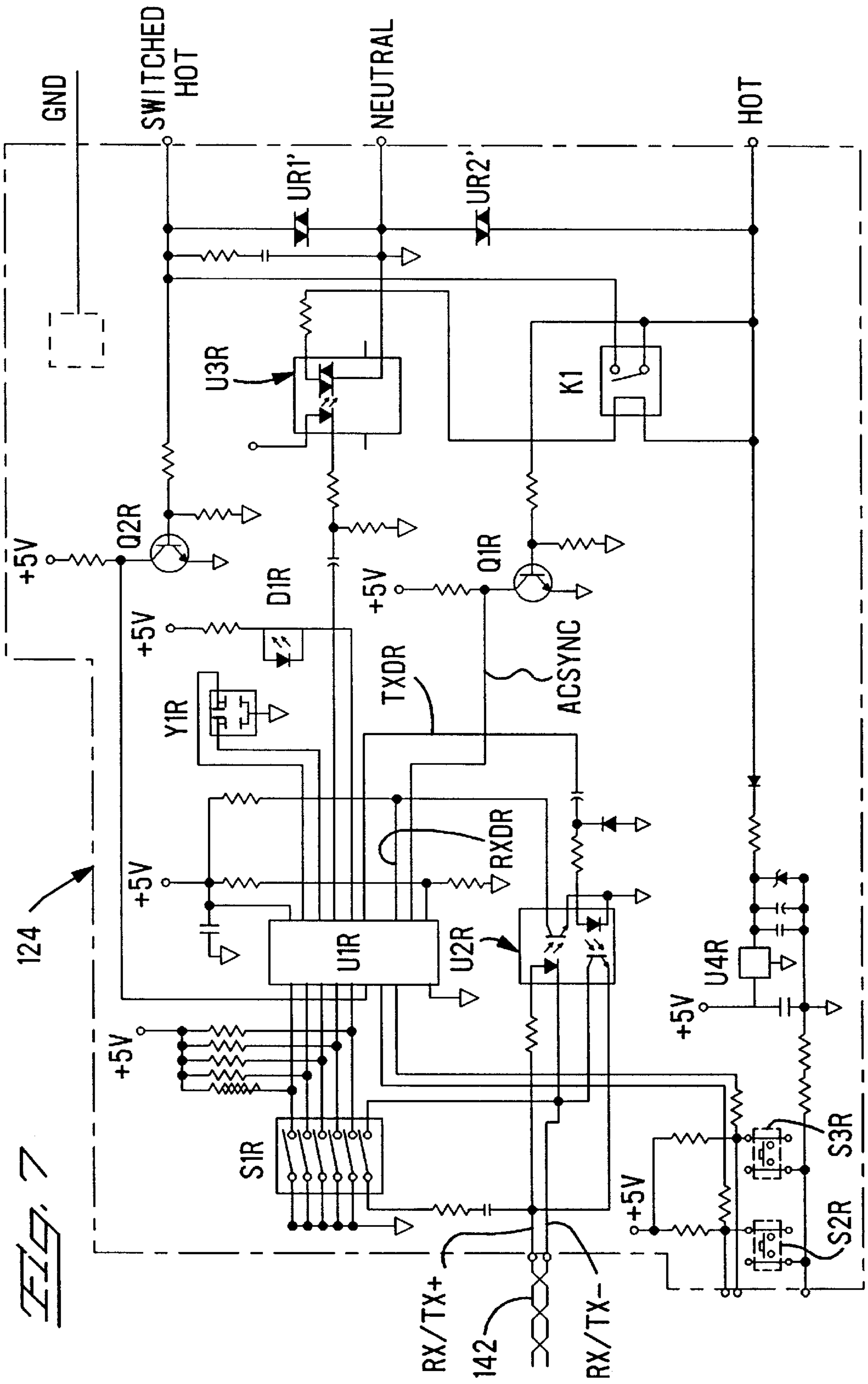
Figure 8:
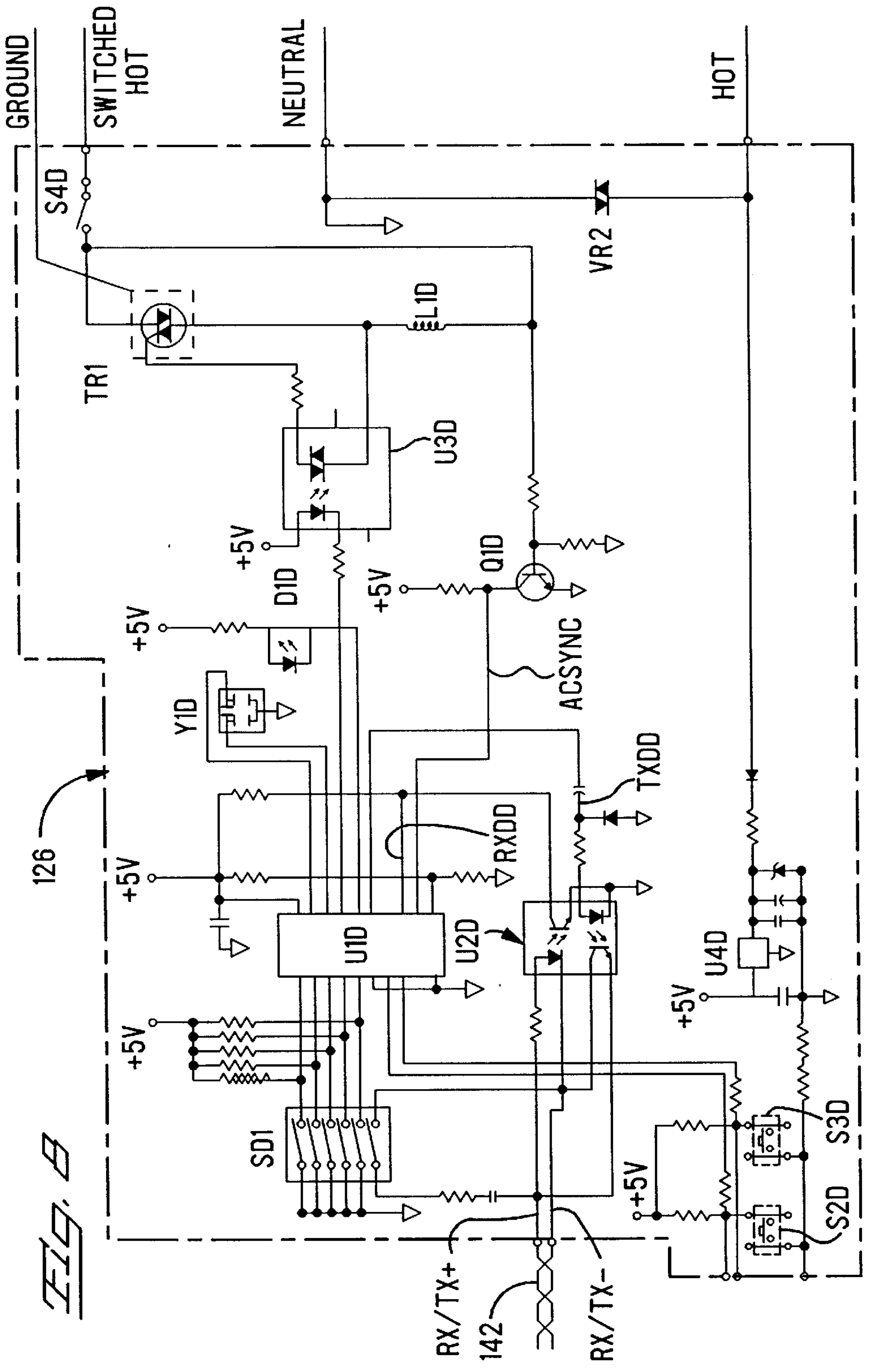
FIG. 8 is a schematic of a dimmer block which could be used in the same embodiment of this invention as the block depicted in FIG. 7.

The dimmer block 126 uses a Triac to control the power to a load. FIG. 6 is a block diagram of the dimmer module. FIG. 8 is a schematic of the dimmer block circuitry which will be discussed subsequently. It is placed between the AC hot line and the controlled load. AC neutral is passed directly to the load and is also used within the dimmer block for AC sensing and for the local power supply return. The AC ground (earth ground) is unused by the dimmer block.

Power delivery to the load can be controlled either via the network or from the local Up and Down switches. The local and remote switches are current-limited to class 2 levels. The network interface is opto-isolated.

The dimmer is locally controlled by sequences of Up and Down switch presses of various durations. This is summarized in the following table. There are two switch activation durations used--a short and a long. A short switch press is defined as lasting less than ⅓ of a second while a long press is defined as being anything greater than that. (The switches are debounced so that multiple closures due to bouncing will not be interpreted as multiple short activations). Also, a sequence (such as a double short down) must have each symbol in the sequence follow the previous symbol by no more than ⅕ seconds.

Local Switch Control Behavior

| | Full Off | Dim | Full on |
|---|---|---|---|
| Down Short | Full Off | Full Off | Full Off |
| Double Down Short | Full Off | Ext. Ramp to Off | Ext. Ramp to Off |
| Down Long | Ramp Down | Ramp Down | Ramp Down |
| Up Long | Ramp Up | Ramp Up | Ramp Up |
| Up Short | Jump to Preset | Full On | Full On |
| Double Up Short | Full On | Full On | Full On |

There are two ramp rates used for ramping the power to the load either up or down. The standard ramp rate is fixed at 4.27 seconds for a full (on to off or off to on) ramp. The other ramp rate is the extended ramp rate. Its default value is 10.67 seconds for a full scale ramp. This value can be changed over the network. The extended ramp rate can be set from 2.13 seconds to 9.71 hours with a resolution of 2.13 seconds.

The dimmer module uses a third ramp rate to effect a "soft-on" characteristic for extending filament life. The soft-on feature limits increases from "off" by a ½ second (full scale) ramp. Since both the standard and extended ramp rates are always greater than ½ second, the "soft-on" ramp only applies to jumps to higher power levels.

The dimmer can also be controlled using this network. The dimmer block responds to the "turn on" and "turn off" commands by supplying full power and no power respectively to the load. The remaining power control commands use extended packets to write to various control registers on the dimmer. See the following table for a complete list of the dimmer registers. Writing to the "light level" register causes a jump to the level specified. A ramp to a specific level is invoked by writing to the "ramp to level" register (for a standard ramp) or the "extended ramp level" register for an extended ramp. Writing any value to the "stop" register stops the ramp. The "stop" register can also be used to stop a locally initiated extended ramp. The "stop" register cannot be used to stop a local standard ramp, however.

The other dimmer registers have no direct effect on the power level delivered to the load. Those registers are described in the register description section. Local (switch) commands take precedence over system commands. A switch sequence in progress or a local standard ramp can not be interrupted by a system command. A locally invoked extended ramp (double down short) can be interrupted by a system command. Any system command received while a local command is being executed is acknowledged and ignored. If the local up or down switches are being pressed, the system command will be ignored even if the local switch indicates a standard ramp to a terminal level that is already achieved. For example, holding the up switch pressed will lock out system commands even if the dimmer is at full on.

The dimmer block has an LED indicator that is used to signal that power is being delivered to the load. This LED is turned on anytime the dimmer level is non-zero. This is equivalent to the "Dimmer on" bit in the status register.

The dimmer block has a register file that is used to control and monitor the dimmer. The register file is accessed using the extended packet types as previously described. The following table identifies the purpose for each register, its index (address) and its type. The register type may be read (R) write (W) or both (R/W). The number in parenthesis in the "Type" column indicates the number of 7-bit data words associated with the register. Extra, "padding" packet bytes may be required to access a register since only 1, 3 5 or 7 data words are allowable in the extended packet type.

Dimmer Block Registers

| Index | Name | Type | Description |
|---|---|---|---|
| 0 | Identification | R(2) | Block identification |
| 1 | Status | R(1) | Block status |
| 2 | Light Level | R/W(1) | Write: Jump to level<br>Read: Current dimmer level |
| 3 | Ramp to level | W(1) | Ramp to level at standard rate |
| 4 | Extended ramp to level | W(1) | Ramp to level at extended rate |
| 5 | Extended ramp rate | R/W(2) | Extended ramp rate in 2⅓ (full scale) increments |
| 6 | Stop | W(0) | Stop ramping |
| 7 | Preset | R/W(1) | Dimmer preset level |

Status Register Bit Definition

| 7 | 6 . . . 4 | 3 | 2 | 1 | 0 |
|---|---|---|---|---|---|
| 0 | Reserved | Up switch on | Down switch on | Dimmer on (level not 0) | Reserved |

When power is removed and applied to the dimmer block a dimmer reset), the block sets the following initial conditions.

Power On Defaults

| | |
|---|---|
| Present Value | 50% (64) |
| Extended Ramp Rate | 10.67 seconds (5) |
| Power Level | 0 (off) |

The dimmer 126 is shown in more detail schematically in FIG. 8. Dimmer 126 is interchangeable with the switch block 124 on the multidrop data bus 142. Transmit and receive signals are isolated from the block by optoisolator U2D, which in turn inputs or outputs signals to microprocessor U1D over a receive line RXDD or a transmit line TXDD. In the preferred embodiment of this invention, microprocessor U1D is a Z86E0812PSC from Zilog. The dimmer uses a triac TR1 to control delivery of power to a load over the switched hot line. An optocoupler U3D is connected to the gate of the triac TR1 and the microprocessor regulates the pulses applied to the gate substantially as described in U.S. patent application Ser. No. 08/212,486. Zero crossing is detected by the microprocessor over the ACSYNC line so that the gate pulses can be properly applied relative to zero crossing of the AC waveform. An air gap switch S4D is located in series between the triac TR1 and the load as required by the National Electric Code. Power to the block is provided from the hot line by a discrete component power supply.

Dip switch S1D is used to establish a unique address for the dimmer switch block 126 in the same manner as dip switch S1R is used for the relay block. A local switch actuator actuates normally open momentary switches S2D and S3D to provide local input to microprocessor in the manner previously described in the Local Switch Control Behavior Table. Remote auxiliary switches can be attached to the dimmer block to provide the same input as the local switches. System control of the dimmers is provided over the branch data bus 142.

FIG. 9 is a diagrammatic view of the basic elements of the interface device 122 showing the manner in which it functions with a system controller 20 and showing the network outputs which are connected to the interface device. These network outputs include up to four data communications branches 142 as well as separate I/O channels including inputs 150 and outputs 152. Again the system controller 20 used with interface device 122 is the system controller described in U.S. Pat. No. 5,218,552.

The interface device 122 comprises one node on one branch controlled by system controller 20. The interface device 122 has a branch interface 154 with which the system controller communicates over a serial branch channel 156 as described in the aforementioned patent. Branch interface 154 included a custom branch chip and supporting circuitry. The branch interface 154 communicates with an appliance interface 158 over a serial appliance channel 160. The appliance interface 158 includes a custom appliance chip which has 8 bit parallel input/output capability. In the interface device 122, an 8 bit microprocessor 162 communicates through the appliance channel and the branch channel with the system controller 20 as a complex device as described in U.S. Pat. No. 5,218,552. In this embodiment of the invention an 80188 microprocessor can be employed. The microprocessor 162 communicates with EPROM 164 in which the operating firmware for the interface device 122 is stored. This firmware facilitates communication by the interface device with system controller 20 and over serial channels with the input and output devices previously described and which will further described herein. The microprocessor 162 also communicates with random access memory 166. Operating parameters for the various devices controlled by interface device 122 is stored in this RAM memory along with status and command data. Three dual UART's 168, 170, and 172 provide serial communication for input/output communication and for communication with other devices by microprocessor 162.

UART 168 has two RS232 ports 174 and 176. Network port 174 is provided for communication between multiple interface devices identical to interface device 122. In this embodiment all interface devices would be under the control of system controller 20, but the devices can communicate directly with each other over the network port 174. In this way an input on one interface device can directly control an output on another interface device without communicating with system controller 20. Thus an input command to one interface device can control an output on another interface device in the same manner as an input can control and output on the same interface device without the intervention by the system controller. UART 168 has a second maintenance serial port 176 over which a programming device such a personal computer can communicate to configure the interface device 122 and the various inputs and outputs. This configuration information is stored in RAM 166 and can be communicated with system controller 20 and through the system controller with other devices controlled by the system controller. For example, information unique to a dimmer or switch node on an interface device network branch can be communicated to a human interface device through system controller 20, so that a user can reconfigure or control interface device nodes. Maintenance port 176 can also be used for diagnostics.

UART's 170 and 172 service serial communication over four branches 142 on which on/off relay blocks 124 and dimmer blocks 126 are located as shown in FIG. 1. Each UART 170 and 172 services two serial branches 142. These UART's also service three optoisolator inputs 150 and three relay outputs 152.

Figure 10:
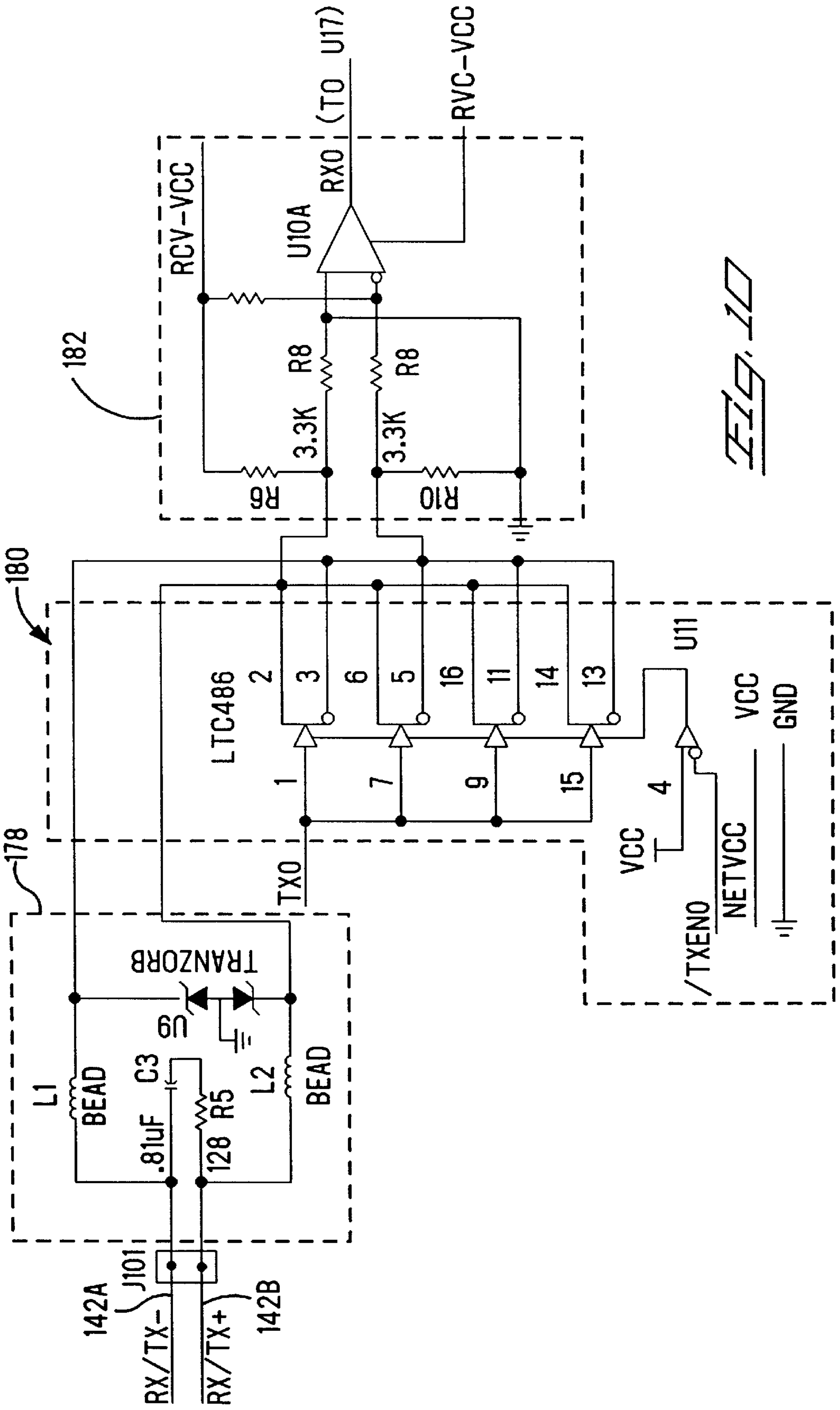
FIG. 10 is a schematic of the transmit and receive circuitry of the peripheral interface device.

FIG. 10 is a schematic of the transmit and receive circuitry of the interface device showing the manner in which signals are transmitted to and received from a single two wire network branch of the lighting and power control subsystem of the preferred embodiment of this invention. Signals to and from the switching blocks located on this branch or multidrop network are transmitted over the single twisted pair branch 142 consisting of two wires 142A and 142B. Signals are transmitted and received over the same two wires, since the subsystem, under the direction of the master interface 122 either transmits or receives at any given time. Signals are not transmitted by the interface device 122 over the network branch 142 at same time that they are received by the network interface device 122. Conversely, none of the switch blocks 124 and 126 transmits at the same time any other block is transmitting or at the same time that the interface device, which controls all signal input and output on the network branch, is transmitting. Conductor 142A is the RX/TX− and conductor 142B is the RX/TX+ conductor. J101 is the connector at which the two wires comprising branch pair 142 are attached to the interface device. The interface device includes noise and surge rejection circuitry 178 to prevent damage to the interface device by extraneous signals on the branch and to prevent undesirable emissions by the interface device on the branch or bus 142.

Transmit circuitry 180 is implemented in the form of a LTC 486 low power quad RS485 driver to which the input lines TX+ 142B and TX− 142A are connected as shown. Transmission by this driver occurs as a result of input over line TXENO from the corresponding UART 170 or 172 as shown n FIG. 9.

A signal is received by the interface device 122 from the branch or bus 142 by receiver circuitry 182. An RS-485 three state differential line receiver such as a DS75176 is employed in this receiver circuit. The input voltage RCV-VCC is +8 VDC. When a signal is received by receiver circuitry 182, a signal RXO is input to the corresponding UART 170 or 172 as shown in FIG. 9.

It is also important to note that the peripheral interface device need not be only a peripheral lighting controller. Other subsystem controllers could employ the same approach and could include standard hardware components which would interface to other systems or systems controllers simply by the installation of appropriate software to establish the appropriate protocol for communication.

What is claimed is:

1. A system for switching electrical power to a plurality of loads on a plurality of hot AC lines, the system comprising:

a plurality of switching control devices, each containing a power switching element, each switch control device being physically located on a hot AC line extending between a source and a load, the power corresponding hot AC lines to a load attached to the switch conttrol device;

a control switch input on each switch control device;

a control interface, and;

at least one signal branch extending from the control interface, a plurality of switch control devices being attached to each signal branch so that control signals can be communicated bewtween the control interface and the switch control devices, the control interface polling selected ones of the switch control devices, and transmitting output signals to other switch control devices so that the power switching element in one switch control device can be controlled by control switch inputs on another selected switch control device.

2. The system of claim 1 wherein the control interface polls a limited number of switch control devices on each signal branch.

3. The system of claim 1 wherein the signal branch is a serial branch.

4. The system of claim 1 wherein a control switch input on a switch control device controls power switching elements on multiple switch control devices.

5. The system of claim 4 wherein the control switch input controls the power switching element on the switch control device to which it is attached.

6. A network for controlling electrical power comprising a bidirectional half duplex serial link between a master interface and a plurality of slave nodes on the serial link, the master interface being capable of communicating with first and second slave nodes, the first slave node comprising a first switch control slave node having a first on/off power switching element with two positions, the master interface communicating with the first switch control slave node with a first packet consisting of a single switch control header byte including the first slave node address and at least one bit characteristic of the two positions and a single checksum byte, the master interface communicating with the second slave node including a switching element continuously variable between and upper and a lower limit with a second multibyte packet including a header byte with

7. The network of claim 6 wherein the first switching element is a relay and the second switching element is a triac.

8. The network of claim 6 wherein the master interface can distinguish between the first and second slave nodes.

9. The network of claim 6 wherein the master interface can communicate with multiple first and second slave nodes having unique addresses on the same multidrop serial link.

10. The network of claim 6 wherein the master interface communicates with the second slave node with a variable length packet including a plurality of bits specifying the length of the packet.

11. The network of claim 6 wherein the master interface polls the first and second slave nodes with a single byte control poll.

12. The network of claim 6 wherein the first and second packets each include a checksum byte.

* * * * *